(12) United States Patent
Zhang et al.

(10) Patent No.: US 8,142,957 B2
(45) Date of Patent: Mar. 27, 2012

(54) METHOD FOR PREPARING A MEMBRANE ELECTRODE OF A FUEL CELL

(75) Inventors: Riqing Zhang, Shenzhen (CN); Junqing Dong, Shenzhen (CN)

(73) Assignee: BYD Company Ltd, Shenzhen (CN)

( * ) Notice: Subject to any disclaimer, the term of this patent is extended or adjusted under 35 U.S.C. 154(b) by 972 days.

(21) Appl. No.: 12/089,683

(22) PCT Filed: Oct. 12, 2006

(86) PCT No.: PCT/CN2006/002686
§ 371 (c)(1),
(2), (4) Date: May 29, 2008

(87) PCT Pub. No.: WO2007/041962
PCT Pub. Date: Apr. 19, 2007

(65) Prior Publication Data
US 2008/0251205 A1    Oct. 16, 2008

(30) Foreign Application Priority Data
Oct. 13, 2005   (CN) .......................... 2005 1 0109353

(51) Int. Cl.
*B32B 27/00* (2006.01)
*B32B 37/00* (2006.01)
(52) U.S. Cl. .......................... 429/535; 156/333; 156/60
(58) Field of Classification Search .................. 429/535
See application file for complete search history.

(56) References Cited

U.S. PATENT DOCUMENTS

| | | | |
|---|---|---|---|
| 4,317,789 A * | 3/1982 | Groult et al. | 264/105 |
| 5,234,777 A | 8/1993 | Wilson | |
| 5,242,764 A | 9/1993 | Dhar | |
| 5,399,184 A | 3/1995 | Harada | |
| 6,054,230 A | 4/2000 | Kato | |
| 6,855,178 B2 | 2/2005 | Uchida et al. | |
| 2004/0009389 A1 * | 1/2004 | Sakai et al. | 429/42 |
| 2004/0058227 A1 * | 3/2004 | Tanaka et al. | 429/44 |
| 2004/0131919 A1 * | 7/2004 | Yasumoto et al. | 429/42 |
| 2005/0142428 A1 | 6/2005 | Daimon et al. | |

FOREIGN PATENT DOCUMENTS

| | | |
|---|---|---|
| CN | 1269428 A | 10/2000 |
| CN | 1276633 A | 12/2000 |
| CN | 1349267 A | 5/2002 |
| CN | 1386309 A | 12/2002 |
| CN | 1437280 A | 8/2003 |
| CN | 1477724 A | 2/2004 |
| CN | 1492531 A | 4/2004 |
| CN | 1560949 A | 1/2005 |
| CN | 1564353 A | 1/2005 |
| CN | 1612381 A | 5/2005 |
| CN | 1949568 A | 9/2010 |
| EP | 1336996 A1 | 8/2003 |
| EP | 0869568 B1 | 10/2006 |
| JP | 9231962 A | 9/1997 |
| JP | 11288727 A | 10/1999 |
| JP | 2000247023 A | 9/2000 |
| JP | 2002524831 A | 8/2002 |
| JP | 2002280012 A | 9/2002 |
| JP | 2003257439 A | 9/2003 |
| JP | 2004311163 A | 11/2004 |
| JP | 2005209402 A | 8/2005 |
| JP | 2005227392 A | 8/2005 |
| JP | 2006012523 A | 1/2006 |
| JP | 2006093033 A | 4/2006 |
| WO | 2005038950 A2 | 4/2005 |

* cited by examiner

*Primary Examiner* — Patrick Joseph Ryan
*Assistant Examiner* — Brent Thomas
(74) *Attorney, Agent, or Firm* — Volpe and Koenig, P.C.

(57) ABSTRACT

The invention provides a method for preparing a membrane electrode of a fuel cell, comprising the steps of preparing diffusion layers, and superimposing the diffusion layers on a proton exchange membrane having a catalyst layer on each surface, wherein the method for preparing the proton exchange membrane having a catalyst layer on each surface comprises the steps of: filling a catalyst slurry containing a catalyst and a bonding agent between two polymer films, and pressing the polymer films filled with the catalyst slurry to obtain a catalyst layer; and superimposing the catalyst layer on each surface of a proton exchange membrane. The method of the present invention can control the thickness of the catalyst layers by pressing during preparation thereof, therefore, the catalyst layers have an even thickness and surface.

11 Claims, No Drawings

METHOD FOR PREPARING A MEMBRANE ELECTRODE OF A FUEL CELL

FIELD OF THE INVENTION

The present invention relates to the field of fuel cells, especially to a method for preparing a membrane electrode of a fuel cell.

BACKGROUND OF THE INVENTION

Fuel cells are cells that convert chemical energy to electric energy directly, and have advantages of high efficiency, low pollution, and low noise, etc. Fuel cells can be individual fuel cells or fuel cell packs comprising a plurality of individual fuel cells.

An individual fuel cell comprises an integral membrane electrode, which usually comprises a proton exchange membrane, two catalyst layers on two sides of said proton exchange membrane, and two diffusion layers on said two catalyst layers respectively.

CN 1437280A discloses a method for producing fuel cells by treating the electrolyte membrane with a solvent, comprising the steps of: immersing the electrolyte membrane of fuel cells in a highly volatile mono-alcohol solvent (e.g., ethyl alcohol) for a certain time, and then immersing the electrolyte membrane in a low volatile poly-alcohol solvent (e.g., ethylene glycol or propylene glycol) for a certain time, to swell the electrolyte membrane sufficiently; coating the catalyst slurry on two sides of the electrolyte membrane; holding the electrolyte membrane coated with catalyst between two diffusion layers, and hot pressing them. Said method coats the catalyst slurry onto the surface of the electrolyte membrane directly and thereby it is difficult to uniformly coat the catalyst thereon. As a result, the catalyst layer of the prepared membrane electrode may have an uneven thickness and an uneven surface.

SUMMARY OF THE INVENTION

An object of the present invention is to provide a method for preparing a membrane electrode of a fuel cell by which the catalyst layer of the obtained membrane electrode has an even thickness and an even surface, to overcome the drawback of the prior art that the catalyst layer of the prepared membrane electrode may have an uneven thickness and an uneven surface.

The present invention provides a method for preparing a membrane electrode of a fuel cell comprising the steps of preparing diffusion layers and superimposing the diffusion layers on a proton exchange membrane having a catalyst layer on each surface, wherein the method for preparing the proton exchange membrane having a catalyst layer on each surface comprises the steps of:
filling a catalyst slurry containing a catalyst and a bonding agent between two polymer films, and pressing the polymer films filled with the catalyst slurry, to obtain a catalyst layer; and
superimposing the catalyst layer on each surface of a proton exchange membrane.

The method of the invention can control the thickness of the catalyst layers by pressing during the preparation thereof; therefore, the catalyst layers have an even thickness and surface.

DETAILED DESCRIPTION OF THE EMBODIMENTS

In the method for preparing a membrane electrode of a fuel cell of the present invention, the proton exchange membrane having a catalyst layer on each surface is prepared by: filling a catalyst slurry containing a catalyst and a bonding agent between two polymer films, and pressing the polymer films filled with catalyst slurry to obtain the catalyst layer; and superimposing the catalyst layer on each surface of a proton exchange membrane.

The polymer films may be selected from the group consisting of PTFE (polytetrafluoroethylene) films, polyester films and polyimide films. Preferably, the polymer films have an even and neat surface.

In the catalyst slurry, the catalyst is known to those skilled in the art. For example, the catalyst may be selected from the group consisting of Pt/C catalyst, Pt—Ru/C catalyst and Pt—Cr/C catalyst. The bonding agent is preferably a bonding emulsion, which is known to those skilled in the art. For example, the bonding emulsion may be an emulsion formed with a bonding agent and water or alcohol such as isopropyl alcohol, ethyl alcohol, or glycerol alcohol, and may be selected from the group consisting of PTFE emulsion, PHFP (polyhexafluoropropylene) emulsion and PVF (polyvinyl fluoride) emulsion. The amount of the bonding agent contained in the bonding emulsion may be 1-42% by weight, and preferably 10-30% by weight.

The catalyst slurry may further contain solvent and Nafion solution. The solvent is known to those skilled in the art; for example, the solvent may be selected from the group consisting of water, isopropyl alcohol, ethyl alcohol and glycerol. The Nafion solution is known to those skilled in the art, and it is typically comprised of Nafion resin, lower alcohols (such as ethyl alcohol, propyl alcohol, and isopropyl alcohol) and water in a ratio of 1:15-16:3-4 by weight. The ratio of the catalyst, solvent, Nafion solution, and bonding emulsion is 1:1.5-5:0.1-2:0.1-2 by weight. It is noted that the solvent does not include the solvent contained in the Nafion solution and the bonding emulsion. The catalyst slurry can be obtained by mixing the catalyst, solvent, Nafion solution, and bonding emulsion.

Then, the catalyst slurry is filled between the two thin polymer films, preferably by coating the catalyst slurry on one polymer film, and then covering the catalyst slurry with the other polymer film. After the filling operation, the polymer films filled with catalyst slurry can be pressed by any method. Preferably, the polymer films filled with catalyst slurry are placed between two rollers and then pressed, to obtain the catalyst layer. The thickness of the catalyst layer can be easily controlled by adjusting the clearance between the rollers. The thickness of the catalyst layer is 5-300 μm, and preferably 10-200 μm.

The proton exchange membrane is known to those skilled in the art. It is commercially available; for example, the Nafion membranes produced by Du Pont, including Nafion112 membrane, Nafion115 membrane, Nafion117 membrane, and Nafion1035 membrane, can be used as the proton exchange membrane.

A catalyst layer is superimposed on each surface of the proton exchange membrane, to obtain a proton exchange membrane having a catalyst layer on each surface. Wherein, before being superimposed on the proton exchange membrane, the catalyst layers may be cut into the required size, and the polymer films on the catalyst layers are peeled off.

Preferably, the catalyst layers are cut into the required size; the polymer film on one surface of one catalyst layer is peeled off, and this surface of the catalyst layer is attached to one surface of the proton exchange membrane; the polymer film on one surface of the other catalyst layer is peeled off, and this surface of the catalyst layer is attached to the other surface of the proton exchange membrane; in that way, the two catalyst layers are superimposed on two surfaces of the proton exchange membrane, to obtain a proton exchange membrane having a catalyst layer on each surface. After the superimposition, a hot pressing can be carried out at a temperature of 60-200° C., and preferably 110-160° C., under a pressure of 0.1-10 MPa, and preferably 0.5-4 MPa for 1-10 min., and preferably 1-5 min, to improve the contact of the catalyst layers with the proton exchange membrane.

In the method for preparing a membrane electrode of a fuel cell of the invention, the diffusion layer may be prepared by coating a conductive slurry containing a conductive agent and a bonding agent onto a conductive bearer.

Said conductive bearer is known to those skilled in the art; for example, said conductive bearer can be carbon paper. Preferably, the conductive bearer is sintered before coating the conductive slurry thereon, to remove the impurities sticking to the conductive bearer. The conductive bearer may be sintered at a temperature of 300-500° C., and preferably 350-450° C. for 15-120 min., and preferably 30-90 min.

Said conductive agent is known to those skilled in the art; for example, the conductive agent can be selected from the group consisting of activated carbon, acetylene black and graphitic carbon black. Said bonding agent is known to those skilled in the art; for example, said bonding agent can be one or more of PTFE, PHFP and PVF. Preferably, said bonding agent is used in the form of aqueous emulsion thereof, wherein the content of the bonding agent in the aqueous emulsion is 5-60% by weight, and preferably 20-60% by weight. Said conductive slurry may further contain a solvent which is known to those skilled in the art; for examples, said solvent can be selected from the group consisting of water, isopropyl alcohol, ethyl alcohol, and glycerol alcohol. The ratio of the conductive agent, bonding agent, and solvent may be 1:0.02-5:0.1-8 by weight, and preferably 1:0.04-2:0.2-5. Wherein, in the case that the bonding agent is in the form of aqueous emulsion, the solvent does not include the solvent contained in the aqueous emulsion. The conductive slurry can be prepared by mixing the conductive agent, bonding agent, and solvent.

The conductive slurry can be coated on the conductive bearer by any known method; for example, said conductive bearer is immersed in the conductive slurry for 2-10 times, and 2-15 min each time. After the conductive slurry is coated on the conductive bearer, the conductive bearer can be dried preferably by drying the conductive bearer coated with conductive slurry in air, then maintaining the conductive bearer at 300-360° C. for 20-60 min, and cooling.

After being prepared, the diffusion layers are superimposed on the proton exchange membrane having a catalyst layer on each surface. Before the superimposition, the polymer films on the surface of the catalyst layers are peeled off.

Preferably, the process that the diffusion layers are attached to the proton exchange membrane having a catalyst layer on each surface comprises the steps of: peeling off the polymer films on one surface of each catalyst layer, and superimposing a diffusion layer on the surface of each catalyst layer, to form the membrane electrode. After the superimposition, a hot pressing can be carried out at a temperature of 60-200° C. and preferably 110-160° C., under a pressure of 0.1-10 MPa and preferably 0.5-4 MPa for 1-10 min and preferably 1-5 min, to improve the contact of the diffusion layers with the catalyst layers.

Preferably, the preparation method of membrane electrode of fuel cell provided in the invention comprises the following steps:
(1) coating the conductive slurry containing the conductive agent and the bonding agent on the conductive bearer to obtain the diffusion layer;
(2) filling the catalyst slurry containing the catalyst and the bonding emulsion between two polymer films, and then pressing the polymer films filled with catalyst slurry, to obtain the catalyst layer;
(3) superimposing a catalyst layer on each surface of the proton exchange membrane respectively, and then superimposing a diffusion layer on the other surface of each catalyst layer respectively, to form the membrane electrode.

However, it will be apparent to those skilled in the art that after the diffusion layers and catalyst layers are prepared, the diffusion layers can be superimposed on the catalyst layers first, and then they are superimposed on the exchange membrane, which shall also be within the scope of the present invention.

The present invention will be described in detail by way of the following examples.

Example 1

This example is used to describe the method for preparing a membrane electrode of a fuel cell of the invention.
(1) Preparation of Diffusion Layers
A carbon paper for the fuel cell (TGP-H-060, manufactured by Toray Industries, Inc.) was sintered at 350° C. for 30 min. Carbon black, aqueous emulsion of PTFE (30 wt % of PTFE), and ethyl alcohol were mixed in a ratio of 1:0.05:4 by weight, to obtain a conductive slurry. The sintered carbon paper was immersed in the conductive slurry for 3 times, and 5 min each time, and then the immersed carbon paper was taken out, dried, maintained at 300° C. for 25 min, and cooled, to obtain the diffusion layer.
(2) Preparation of Catalyst Layers
Pt/C catalyst, solvent (a mixed solvent of isopropyl alcohol and ethyl alcohol in a ratio of 1:1 by weight), Nafion solution (Nafion resin:ethyl alcohol:water=1:15:3), and aqueous emulsion of PTFE (20 wt % of PTFE) were mixed in a ratio of 1:5:1.5:1.5 by weight, to obtain the catalyst slurry. The catalyst slurry was coated on the surface of a PTFE film, and then covered with another PTFE film. The PTFE films filled with catalyst slurry were placed between two cylindrical rollers to roll them, to obtain a catalyst layer having a thickness of 10 µm.
(3) The catalyst layers were cut into the required size, the PTFE film on one surface of a catalyst layer was peeled off, and the surface of the catalyst layer was attached to one surface of Nafion1035 membrane, to superimpose the catalyst layer on the Nafion1035 membrane. In the same manner, one surface of another catalyst layer was attached to the other surface of said Nafion1035 membrane, to superimpose the catalyst layer on said Nafion1035 membrane. After the superimposition, the catalyst layers and Nafion1035 membrane were hot pressed at 110° C. under 0.5 MPa for 1 min. The PTFE film on the other surface of each catalyst layer was peeled off, and the diffusion layer was superimposed on the other surface of each of the two catalyst layers, to obtain the membrane electrode.

Example 2

This example is used to describe the method for preparing a membrane electrode of a fuel cell of the invention
(1) Preparation of Diffusion Layers
A carbon paper for the fuel cell (TGP-H-060, manufactured by Toray Industries, Inc.) was sintered at 400° C. for 90 min. Acetylene black, aqueous emulsion of PHFP (50 wt % of PHFP), and isopropyl alcohol were mixed in a ratio of 1:1.8:0.5 by weight, to obtain the conductive slurry. The sintered carbon paper was immersed in the conductive slurry for 8 times, and 10 min each time, and then the immersed carbon paper was taken out, dried, maintained at 360° C. for 60 min, and cooled, to obtain the diffusion layer.

(2) Preparation of Catalyst Layers

Pt/C catalyst, ethyl alcohol, Nafion solution (Nafion resin:ethyl alcohol:water=1:15:3), and aqueous emulsion of PHFP (30 wt % of PHFP) were mixed in a ratio of 1:2:0.2:0.2 by weight, to obtain the catalyst slurry. The catalyst slurry was coated on the surface of a PTFE film, and then covered with another PTFE film. The PTFE films filled with catalyst slurry were placed between two cylindrical rollers to roll them, to obtain a catalyst layer having a thickness of 180 μm.

(3) The catalyst layers were cut into the required size, the PTFE film on one surface of a catalyst layer was peeled off, and the surface of the catalyst layer was attached to one surface of Nafion115 membrane, to superimpose the catalyst layer on the Nafion115 membrane. In the same manner, one surface of another catalyst layer was attached to the other surface of said Nafion115 membrane, to superimpose the catalyst layer on said Nafion115 membrane. After the superimposition, the catalyst layers and Nafion 115 membrane were hot pressed at 150° C. under 3.5 MPa for 2 min. The PTFE film on the other surface of each catalyst layer was peeled off, and the diffusion layer was superimposed on the other surface of each of the two catalyst layers, to obtain the membrane electrode.

Example 3

This example is used to describe the method for preparing a membrane electrode of a fuel cell of the invention (1) Preparation of Diffusion Layers A carbon paper for the fuel cell (TGP-H-060, manufactured by Toray Industries, Inc.) was sintered at 430° C. for 60 min. Acetylene black, aqueous emulsion of PHFP (30 wt % of PHFP), and ethyl alcohol were mixed in a ratio of 1:0.8:2 by weight, to obtain the conductive slurry. The sintered carbon paper was immersed in the conductive slurry for 4 times, and 12 min each time, and then the immersed carbon paper was taken out, dried, maintained at 310° C. for 40 min, and cooled, to obtain the diffusion layer.

(2) Preparation of Catalyst Layers

Pt/C catalyst, solvent (a mixed solvent of isopropyl alcohol and ethyl alcohol in a ratio of 1:1 by weight), Nafion solution (Nafion resin:ethyl alcohol:water=1:16:4), and aqueous emulsion of PTFE (15 wt % of PTFE) were mixed in a ratio of 1:3:1:1 by weight, to obtain the catalyst slurry. The catalyst slurry was coated on the surface of a PTFE film, and then covered with another PTFE film. The PTFE films filled with catalyst slurry were placed between two cylindrical rollers to roll them, to obtain a catalyst layer having a thickness of 60 μm.

(3) The catalyst layers were cut into the required size, the PTFE film on one surface of a catalyst layer was peeled off, and the surface of the catalyst layer was attached to one surface of Nafion117 membrane, to superimpose the catalyst layer on the Nafion117 membrane. In the same manner, the surface of another catalyst layer was attached to the other surface of said Nafion117 membrane, to superimpose the catalyst layer on said Nafion117 membrane. Then the PTFE film on the other surface of each of the two catalyst layers was peeled off, and a diffusion layer was superimposed on the other surface of each of the two catalyst layers. After the superimposition, the diffusion layer, the catalyst layers and Nafion 117 membrane were hot pressed at 125° C. under 3 MPa for 3 min, to form the membrane electrode.

What we claim is:

1. A method for preparing a membrane electrode of a fuel cell, comprising the steps of preparing diffusion layers, and superimposing the diffusion layers on a proton exchange membrane having a catalyst layer on each surface, characterized in that the method for preparing the proton exchange membrane having a catalyst layer on each surface comprises the steps of:
    filling a catalyst slurry containing a catalyst and a bonding agent between two polymer films, and pressing the polymer films filled with the catalyst slurry, to obtain a catalyst layer; and
    superimposing the catalyst layer on each surface of a proton exchange membrane, and wherein before the catalyst layers are superimposed on the proton exchange membrane and the diffusion layers are superimposed on the proton exchange membrane having a catalyst layer on each surface, the polymer films on the catalyst layers are peeled off.

2. A method for preparing a membrane electrode of a fuel cell, comprising the steps of preparing diffusion layers, and superimposing the diffusion layers on a proton exchange membrane having a catalyst layer on each surface, characterized in that the method for preparing the proton exchange membrane having a catalyst layer on each surface comprises the steps of:
    filling a catalyst slurry containing a catalyst and a bonding agent between two polymer films, and pressing the polymer films filled with the catalyst slurry, to obtain a catalyst layer; and
    superimposing the catalyst layer on each surface of a proton exchange membrane, wherein the catalyst slurry containing the catalyst and the bonding agent is filled between two polymer films by coating the catalyst slurry on one polymer film and then covering the catalyst slurry with the other polymer film.

3. The method according to claim 1, wherein the polymer films filled with the catalyst slurry is pressed by placing them between two rollers to roll, so that the catalyst layer has a thickness of 10-200 μm.

4. The method according to claim 1, wherein said polymer film is selected from the group consisting of PTFE film, polyester film and polyimide film;
    said catalyst is selected from the group consisting of Pt/C catalyst, Pt—Ru/C catalyst and Pt—Cr/C catalyst; and
    said bonding agent is a bonding emulsion selected from the group consisting of PTFE emulsion, PHFP emulsion and PVF emulsion.

5. A method for preparing a membrane electrode of a fuel cell, comprising the steps of preparing diffusion layers, and superimposing the diffusion layers on a proton exchange membrane having a catalyst layer on each surface, characterized in that the method for preparing the proton exchange membrane having a catalyst layer on each surface comprises the steps of:
    filling a catalyst slurry containing a catalyst and a bonding agent between two polymer films, and pressing the polymer films filled with the catalyst slurry, to obtain a catalyst layer; and
    superimposing the catalyst layer on each surface of a proton exchange membrane, wherein said catalyst slurry further contains solvent and Nafion solution; the solvent is selected from the group consisting of water, isopropyl alcohol, ethyl alcohol and glycerol alcohol; and said catalyst, solvent, Nafion solution, and bonding agent are contained in a ratio of 1:1.5-5:0.1-2:0.1-2 by weight.

6. The method according to claim 1, wherein it further comprises a hot pressing step after the catalyst layers are superimposed on the proton exchange membrane and/or after the diffusion layers are superimposed on the proton exchange membrane having a catalyst layer on each surface.

7. The method according to claim 6, wherein said hot pressing is carried out at 60-200° C. under 0.1-10 MPa for 10 min.

8. The method according to claim 1, wherein the method for preparing said diffusion layers comprises: coating a conductive slurry containing a conductive agent and a bonding agent on a conductive bearer, to obtain the diffusion layer.

9. The method according to claim 8, wherein said conductive bearer is sintered at 300-500° C. for 15-120 min, before the conductive slurry is coated thereon.

10. The method according to claim 8, wherein said conductive bearer is carbon paper; said conductive agent is selected from the group consisting of activated carbon, acetylene black and graphitic carbon black; and said bonding agent is selected from the group consisting of PTFE, HFP and PVF.

11. The method according to claim 8, wherein said conductive slurry containing the conductive agent and the bonding agent is coated on said conductive bearer by immersing said conductive bearer in said conductive slurry for 2-10 times, and 2-15 min each time.

\* \* \* \* \*